United States Patent [19]
Gabrielyan et al.

[11] Patent Number: 4,883,102
[45] Date of Patent: Nov. 28, 1989

[54] DRAIN LINE APPARATUS

[75] Inventors: Mher Gabrielyan, 5921 Fountain Ave., Los Angeles, Calif. 90028; John R. Brestel, Sepulveda, Calif.

[73] Assignee: Mher Gabrielyan, Hollywood, Calif.

[21] Appl. No.: 16,127

[22] Filed: Feb. 18, 1987

[51] Int. Cl.⁴ .............................................. B65B 3/04
[52] U.S. Cl. ....................................... 141/98; 141/65; 141/387; 141/352; 141/354; 184/1.5; 137/615; 137/616.5
[58] Field of Search ................. 141/65, 351, 352, 353, 141/354, 355, 250, 231, 311 A, 113; 197/312, 313, 61, 616.5, 616.7; 222/108

[56] References Cited

U.S. PATENT DOCUMENTS

| | | | |
|---|---|---|---|
| 1,582,758 | 4/1926 | Jones | 141/331 |
| 1,606,342 | 11/1926 | Bruce | 184/1.5 |
| 1,631,129 | 6/1927 | Hiscox et al. | 184/1.5 |
| 1,687,980 | 10/1928 | Higgins et al. | 184/1.5 |
| 2,025,639 | 12/1935 | Bradford | 141/18 |
| 2,588,869 | 3/1952 | Pinaire | 141/113 |
| 3,631,904 | 1/1972 | Mason et al. | 141/351 |
| 4,235,264 | 11/1980 | Rauet et al. | 141/98 X |
| 4,274,645 | 6/1981 | Ferguson et al. | 184/1.5 |
| 4,386,639 | 6/1983 | Gable et al. | 141/351 |

*Primary Examiner*—Ernest G. Cusick
*Attorney, Agent, or Firm*—Frank L. Zugelter

[57] ABSTRACT

A tank drain apparatus comprising an annular seal member (56) mounted on a tube (55) in turn mounted on a transparent drain hose (72), a sleeve (67) connecting tube (55) and hose (72) together, a portable ground stand assembly (15), and a unique leverage mechanism (10) operatively connecting sleeve (67) and stand (15) together, so that seal member (56) can be elevated to or lowered from the tank. A blade (61) in seal member (56) engages a drain valve while indicia (80, 83) on sleeve (67) indicates egree of angular rotation for tube (55) as against sleeve (67) to show the valve is opened or closed. Linkage mechanism (10) is adjustable in terms of its position on stand assembly (15). Also, the effort arm (36) of mechanism (10) can be locked in place by a clamping screw (52)-and-rod (53) arrangement mounted below the pivot point on the stand (15) for effort arm (36), to maintain seal member (56) in its elevated position against the tank's drain outlet.

21 Claims, 2 Drawing Sheets

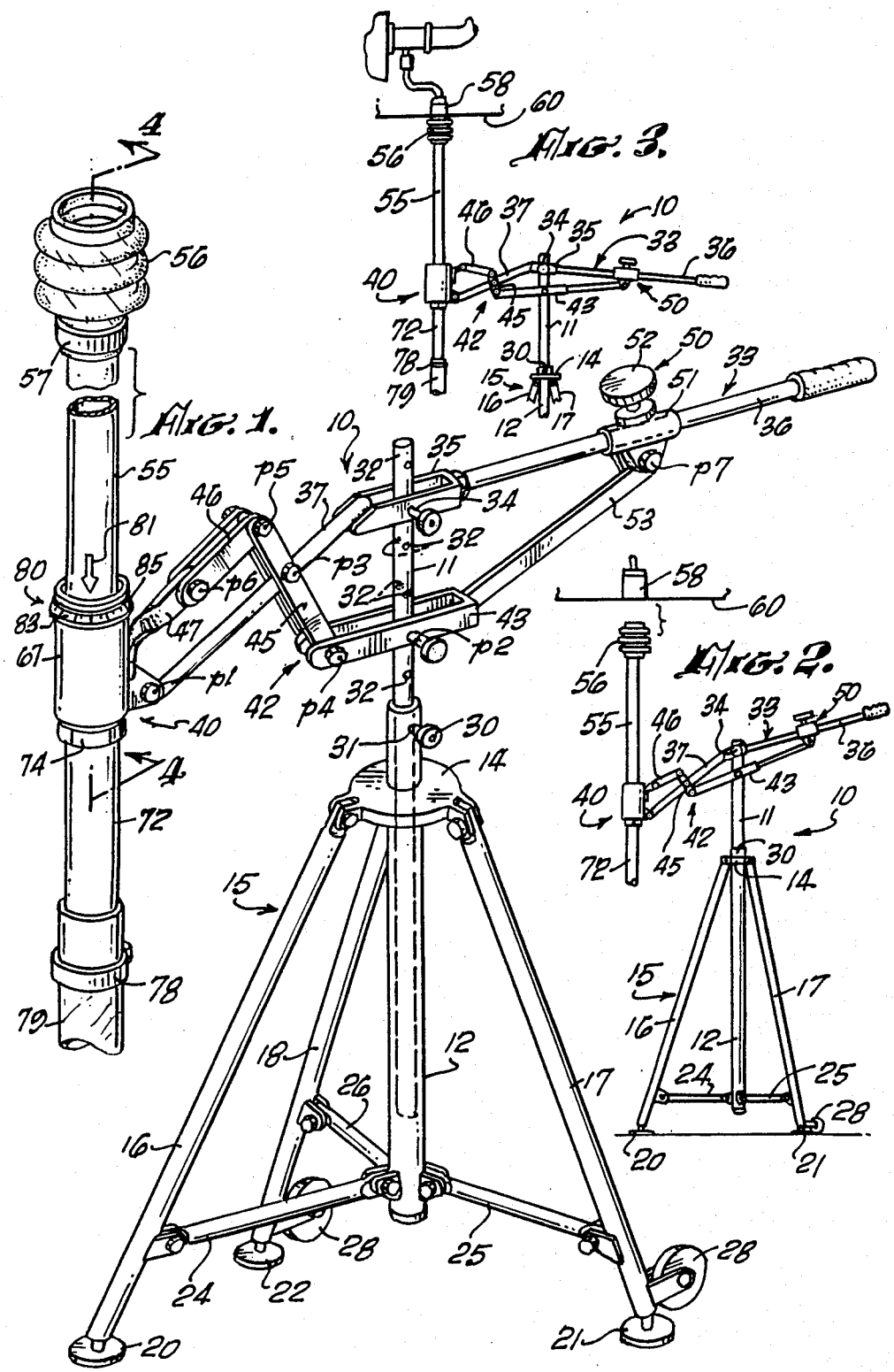

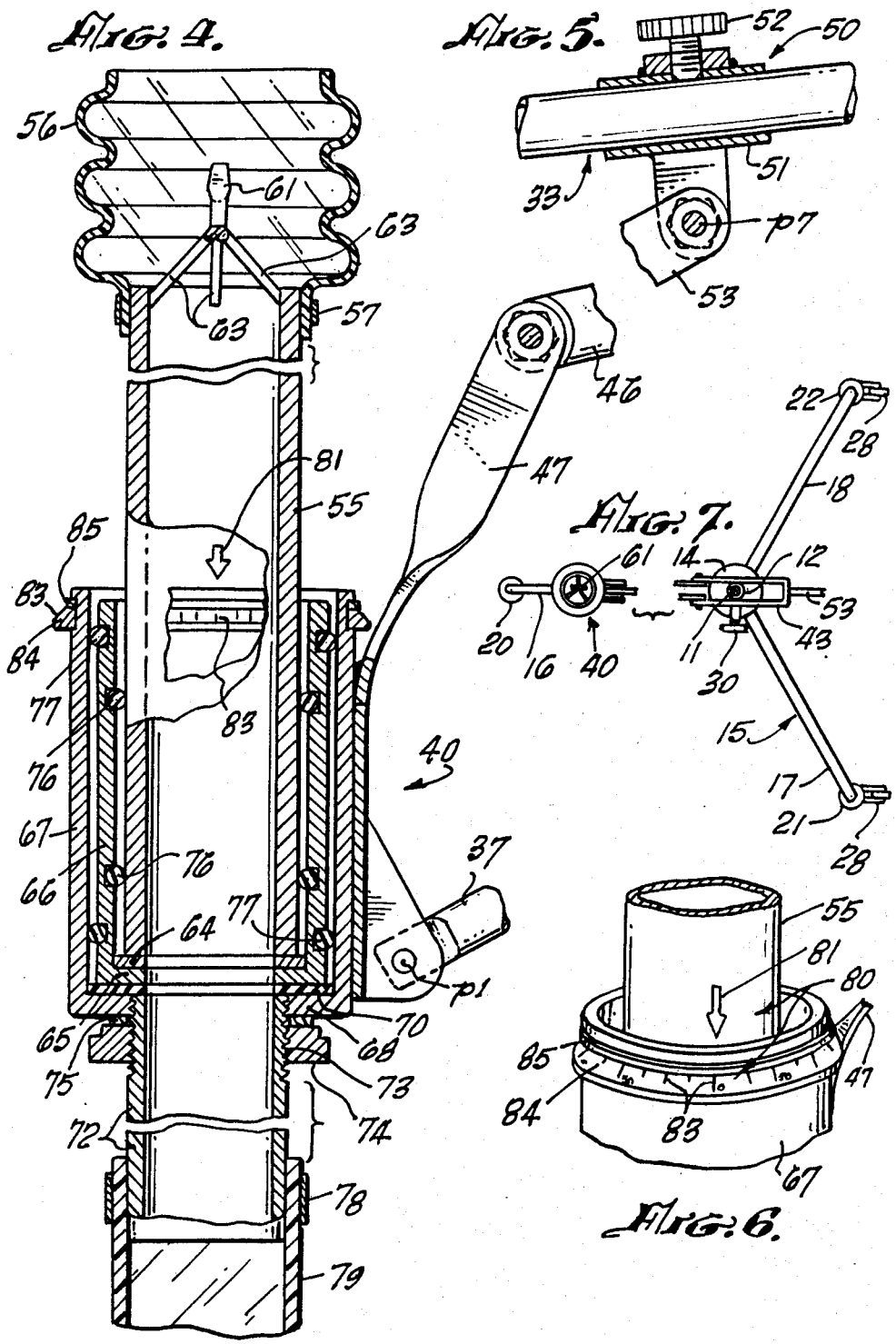

DRAIN LINE APPARATUS

TECHNICAL FIELD

This invention relates to liquid drainage apparatus, and in particular, to an apparatus for draining liquid fuel and/or condensation out of a fuel tank of an aircraft or from a manifold attached to a valve within the wing.

DISCLOSURE OF THE INVENTION

A. Background

Before some kinds of maintenance on aircraft are begun, safety procedure requires that its inflammable fuel first be removed from its wing tanks or manifolds in front of the tanks. A valve, an example of which is disclosed in U.S. Pat. No. 4,437,487, issued March 20, 1984, is mounted in the lower surface of a wing, or in a manifold mounted within the wing, or the like, and is opened for discharge of the fuel and/or condensate in the tank. Also, residual fuel at times is desired to be drained.

B. Problems in Prior Art Practices

The heights of wings of different aircrafts containing fuel tanks vary from the ground on which servicing personnel must work with drainage equipment. Consequently, drainage apparatus must be adjustable in height, to adapt to these different distances between ground and wing on different kinds of aircraft, as well as combining such height adjustability with a mechanism to open and close the valve along with the drainage function of the apparatus.

C. Advantages of this Invention

This invention provides for ready disposal of fuel, prior to aircraft servicing, in winged tanks on all aircraft having a discharge valve in the lower surface of its wings or in manifolds within the wing frame itself or in the tanks themselves, irrespective of the height of the wing from the ground. The funneling means through which the fuel is to be drained is capable of being elevated to the necessary height while at the same time the apparatus provides for opening of the valve through which the fuel will drain, all accomplished without the need of personnel to monitor the drainage after the apparatus is applied to the valve.

D. Summary of the Invention

The subject matter of the invention comprises a funneling means readily and quickly elevatable to encompass the valve through which the fuel from its tank is to drain, means accompanying such funneling means to open and close the valve, actuating mechanisms for such elevating and opening functions and by which the apparatus remains in an operative mode for drainage, and a portable, readily movable tripod or other ground support assembly including a stand mast one which these elements mount. A first-class lever means is pivotally mounted on the stand mast as well as a linkage mechanism which inter-relates to the first-class lever means, and which are operatively connected to the funneling means. Means for opening and closing the valve are included within the funneling means. The lever and linkage mechanism are adjustably located along the length of the stand mast so as to provide the desired "lift" or elevation to the underside of a particular wing, whereby the funneling and valve opening/closing functions can take place. Indicia are included on the funneling elements by which the degree of opening and closing of the valve is measured.

E. Objects of the Invention

An object of this invention is to provide a liquid drainage apparatus simple in operation and effective in draining liquid from a tank, particularly a fuel tank on aircraft.

Another object of the invention is to provide adjustability in height to the funneling and valve opening means of the apparatus in order to service aircraft having wings at different heights from the ground.

Another object of this invention is to assist service personnel in knowing when the valve is open or closed for drainage purposes, by including indicia which measure the degree of opening and closing of the valve.

A further object of the invention is to provide mobility to the apparatus whereby less time is required between points of drainage on an aircraft.

Another object of this invention is to determine the completion of drainage, by including transparency in a discharge hose for the apparatus.

A further object of the invention is to reduce the amount of physical work otherwise entailed in draining aircraft wing tanks.

A still further object of the invention is to provide adjustability in height for the apparatus in order to accomodate the height of a particular wing on any given aircraft.

A further object of this invention is to release servicing personnel from monitoring operation, to perform other duties, thus reducing labor costs overall in servicing an aircraft.

These and other objects of the invention will become more fully apparent by a complete and full reading of the following description, the appended claims thereto, and the drawing comprising two (2) sheets of figures.

BRIEF DESCRIPTION OF THE DRAWING

FIG. 1 is a perspective view of an apparatus embodying my invention.

FIG. 2 is a schematic diagram showing initial position for the apparatus of FIG. 1 prior to its registration to a drainage valve of a wing tank.

FIG. 3 is a schematic diagram showing registration of the FIG. 1 apparatus to such a valve on a wing's lower surface or that of a fuel tank.

FIG. 4 is a view taken on line 4—4 of FIG. 1.

FIG. 5 is a fragmentary cross-sectional view of a means for locking the funneling elements in a desired elevated or lowered mode or position.

FIG. 6 is an enlarged perspective view of a portion of the funneling means disclosing angular or degree gradations which tell servicing personnel whether the valve to which the apparatus is applied is opened or closed.

FIG. 7 is a schematic plan view of the apparatus, showing a suitable physical relationship of funneling means, ground support assembly and stand mast.

DESCRIPTION OF THE PREFERRED EMBODIMENT

Referring now to the figures wherein reference characters correspond to like numerals hereinafter, reference character 10 identifies an apparatus embodying the invention. Apparatus 10 comprises a stand mast 11 mounted in a tubular post or member 12 supported by an apertured collar 14 disposed at the top of a ground or tripod assembly 15 having three equi-distanced legs 16, 17, 18, each being suitably pivotally attached at their upper ends to coller 14. Legs 16, 17, 18 extend downwardly to their lower ends at which feet 20, 21 and 22 are respectively suitably mounted thereto. Three connecting links or rods 24, 25, 26 suitably connect together in pivotal fashion the bottom or lower end of tubular post 12 with the lower portions of legs 16, 17, 18, respectively, all of which stabilizing apparatus 10 on ground or other working surface. A wheel assembly 28 is suitably securely mounted at the lower ends of at least two of the three legs 16, 17, 18, as shown in FIG. 1, for transporting apparatus 10 from one location to another, simply by tilting the apparatus onto two wheel assemblies 28 and thereafter rolling it across the surface.

Stand mast 11 is conveniently telescopically situated at any suitable height relative to tubular post 12 by means of a locking pin 30 which fits into a pair of diametrically opposed holes 31 (only one seen in FIG. 1) in tubular post 12, and through a pair of diametrically disposed holes 32 formed in the body of stand mast 11 and which are aligned with holes 31. Stand mast 11 includes a series of spaced pairs of holes 32 along its length, readly observed in FIG. 1. These same pairs of diametrically opposed holes 32 also serve for pinning other elements of apparatus 10 to stand mast 11, for other purposes, as will become apparent hereinafter.

A first-class lever 33 is suitably pivotally mounted to stand mast 11 by means of a pin 34 passing through a pair of cooperating holes 32 and through its bifurcated fulcrum element 35 which slips over stand mast 11. Its effort arm 36 is suitably secured, such as by welding, to the one end of fulcrum element 35, while its load arm 37 is likewise secured at the other end of the bifurcated fulcrum element 35. Load arm 37 is inclined downwardly from the axis of effort arm 36. A funneling means 40 is suitably pivotally attached, as at p1, FIG.1 to the end of load arm 37, so that as effort arm 36 is lowered and raised about the fulcrum formed by element 35 on stand mast 11, funneling means 40 raises or lowers in an arcuate manner about the axis for pin 34.

A means 42 for maintaining a vertical or other desired drainage (by gravity) orientation in the movement upwardly or downwardly of funneling means 40 is provided. Means 42 comprises a series of linkages and rods which interrelate with stand mast 11 and load arm 37 in such a manner as to maintain such orientation in operation of apparatus 10. Means 42 comprises a bifurcated member or arm 43 suitably pivotally attached, as at p2, FIG. 1, to a pair of holes 32 in stand mast 11, below its fulcrum for first-class lever 33, a first link 45 suitably pivotally mounted, as at p3, FIG. 1, to load arm 37 and having its one end suitably pivotally attached, as at p4, FIG. 1, to one end of bifurcated member 43, while a second link 46 has its one end suitably pivotally mounted, as at p5, FIG. 1, to the other end of the first link 45 and its second end suitably pivotally attached, as at p6, FIG. 1, to a spacer element 47 welded to funneling means 40.

It now should be apparent that drainage orientation is always available in this invention, irrespective of the arc or degree of motion through which load arm 37 travels.

A means 50, FIGS. 5, 1 for locking funelling means 40 in a desired elevated or lower mode, i.e., is provided. Locking means 50 comprises a sleeve 51 slidably mounted on effort arm 36, having a clamping screw 52 to clamp it to a particular point on arm 36, and a rod 53 suitably pivotally attached, as at p7, to sleeve 51 at its one end while its other end is fixedly attached to the other end of bifurcated member 43, FIG. 1. It now should be apparent that by fixing the maintaining means 42 in a particular position on mast 11, funneling means 40 itself is locked in its position.

It will be observed from FIGS. 1 and 7 that first-class lever 33 and the inter-linkage mechanism immediately described above generally lie within the same vertical plane which passes through the axis or axes, FIG. 7, of stand mast 11 and tubular post 12. It also will be observed from schematic FIG. 7 that pin 30 lies at generally a right angle to such plane, while funneling means 40 remains within the geometrical circumferential outline for feet 20, 21, 22 of apparatus 10, all of which provides stability to and non-tilting advantages to the apparatus.

Funneling means 40, FIGS. 4, 1, comprises a rigid tubular member 55 at the top of which an annular seal member 56 is suitably secured, as by a clamp 57, for encompassing a valve 58, FIGS. 2, 3, in the wing's lower surface 60. Also securely mounted at the top of tube 55 is a blade 61, FIG. 4, disposed generally in alignment with the axis of tube 55 by means of a three-rod support 63 all welded to blade 61 and to and about tube 55 adjacent its top. These particular elements 61, 56, 55 are not original to the patentee, but have been and are utilized in aircraft valve servicing. Blade 61 essentially is an element which engages a valve or the like, after which by axial and/or rotational movement of such blade, the valve is caused to open or to close.

Tube 55 extends downward from seal 56 to suitably seat on an annular brass ring 64 supported on an annular flange 65 of an adaptor 66. Adaptor 66 comprises a sleeve, preferably aluminum, the diametrical size of which will vary, depending upon the diametrical size for tube 55 which in turn varies depending upon what make or model of aircraft is being serviced. Adaptor 66 extends upwardly from flange 65, towards seal 56, terminating generally at the same level as an exteriorly mounted metal sleeve 67 to which spacer 47 is secured, such as by welding, and to which load arm 37 is suitably pivotally attached as at p1. The bottom of sleeve 67 includes an annular shoulder 68 which supports flange 65 which is seated atop a fuel resistant rubber gasket 70 (such as Neoprene) mounted on shoulder 68. Shoulder 68 includes a threaded opening into which a metal tubular conduit 72 is threaded as at 73 and secured thereto by means of a locking collar 74 applied against a washer 75 mounted to the bottom of shoulder 68. Suitable O-rings 76, 77 provide a desired spacing between tube 55 and adaptor 66, and between adaptor 66 and sleeve 67, respectively, in addition to providing a sealing function against discharge of fuel through the exposed tops or open ends of adaptor 66 and sleeve 67. At the lower end of conduit 72, a hose clamp 78 secures a transparent drainage hose 79 thereto, and through which drained fuel flows to a predetermined catch basin or the like.

Means 80, FIGS. 6, 1, for indicating the degree of angular rotation of tube 55 to sleeve 67 is provided. An arrow 81 is mounted along tube 55 while degree gradations 83 are mounted on and about a ring 84 slidably mounted around sleeve 67, adjacent its top, and held in place by a snap lock ring 85. Thus, during operation of apparatus 10, the degree of rotation of blade 61, which rotates with tube 55, is readily measured by the angular displacement of rotation of arrow 81 relative to a particular degree gradation 83 mounted on ring 84. And by knowing the number of degrees of rotation for certain elements in drain valve 58 to open and close it, service personnel can cause the same angular displacement for blade 61, as measured by the correlation of the indicia 81, 83, thereby likewise opening and closing the valve.

In operation, apparatus 10 is towed or pushed across a working surface by means of wheel asemblies 28 to a location under the lower surface 60 of a wing, FIG. 2, and below its fuel tank's drain valve 58. A particular-sized adaptor 66, with brass ring 64 therein, and with O-rings 76, 77 mounted in their corresponding grooves of the adaptor, is fitted over tube 55. This subassembly then is inserted into sleeve 67 that is securely mounted to spacer 47 of apparatus 10, tube 55 capable of sliding abut or rotating on bass ring 64. Transparent hose 79 clamped to conduit 72 can be mounted already to sleeve 67, or at this point of operation, be so mounted, by means of locking collar 74.

The elements pivoting about p1, p2 have been or now may be mounted to stand mast 11 at pairs of holes 32, as shown in FIG. 1, or farther down the length of stand mast 11, as determined by the height of wing over ground surface. This is readily determined by actuating arm 36 to arcuately raise funneling means 40 under a wing having a particular height above the working surface, and thereby know whether the pivot p2 and that at pin 34 must be relocated to any one of the series of pairs of holes 32 in stand mast 11. Upon accomplishing that, effort arm 36 is pivoted about pin 34 on stand mast 11, thereby compressing seal 56 against surface 60 in order to expose blade 61 to a slot or recess in an element in a drain valve 58 located in the wing of surface 60, an example of such a valve shown in U.S. Pat. No. 4,437,487. Upon engagement of blade 61 to such slot or recess, effort arm 36 is continued to be lowered, the blade pushing against resilient elements of the valve. Degree ring 84 includes a degree indicia, say 0 (zero) degrees, which is manually lined up with arrow 81 on tube 55. When drain valve 58 requires a rotational adjustment in addition to an axial displacement for some of its elements in order for it to become open for fluid discharge, the servicing personnel rotates sleeve 55, and thus blade 61 engages valve 58, to cause valve 58 to open. As soon as the servicing personnel sees the flow of fluid through transparent hose 79, he locks sleeve 51 to arm 36 by tightening the knob of screw 52. With such tightening, funneling means 40 and blade 61 remain in their fixed positions relative to the opened valve, i.e., with seal 56 physically engaging wing surface 60.

No further constant monitoring of drainage is required, and the personnel can attend other duties. As soon as the flow of fluid quits, by observing transparent hose 79, tube 55 is reverse rotated the same number of degrees it was initially rotated and as shown by the indicia means 81, 83 so that the service personnel can properly remove blade 61 from within valve 58. Once tube 55 is so reverse rotated, the knob of clamp screw 52 is released, and arm 36 raised, funneling means 40 thereby being lowered. Blade 61 is removed from the valve which closes. Apparatus 10 then is ready for use again at a different location.

In assembly, stand mast 11 is inserted into its tubular casing 12, being fastened therein by means of pin 30 through aligned pairs of holes 31, 32. Tripod assembly 15 with apertured collar 14 has previously been fabricated for this assembly step to be taken. Bifurcated member 43 with its fixed arm 53 is slipped down over mast 11 and pinned thereto at p2 with a suitable pinning element. First-class lever means 33 previously fabricated is introduced upon stand mast 11 for pinning thereof at 34 to the pair of holes 32 in stand mast 11. Prefabricated sleeve element 51 and its screw 52 are slidably mounted to arm 36 and thereafter arm 53 pivotally attached thereto as at p7. Link member 45 is pivotally attached to load arm 37 as at p3, and thereafter pinned as at p4 and p5 to members 43 and 46, respectively. Member 46 and arm 37 are pinned, as at p6 and p1, respectively, to spacer 47 a length of which has been welded to sleeve 67. Conduit 72 is threaded to the opening in shoulder 68 of sleeve 67, and secured by means of collar 74 mounted on gasket 75. Adaptor 66 is readily insertable into sleeve 67, upon brass ring 64, anytime prior to mounting tube 55 (with blade and seal) therein. Transparent hose 79 is attachable at any desired time prior to utilization of apparatus 10.

The elements of apparatus 10 are fabricated from known metals such as iron, steel, aluminum, or other suitable metals, as well as from rubber for sealing member 56 and plastic for hose 79, where suitable. Suitable pinning screws, pins or the like connect the described pivotal attachments together, as well as connecting together stand mast and tubular casing. Known manufacturing techniques and processes are utilized for construction of the described elements and prefabricated sub-assemblies of the apparatus described above.

Various modifications and changes may be made in the apparatus as disclosed herein without escaping the scope and spirit of the invention and as set forth in the appended claims. For example, the linkages shown in FIG. 1 may take forms other than the bifurcated or physical duality of the parts as shown therein. Also, strap or spacer 47 can be affixed directly to a tube 55 that in turn can be suitably connected to a transparent hose 79. In some cases, elements in drain valve 58 need not be rotated to open or close the valve, but rather it is opened or closed merely by blade 61 pushing or withdrawing. In such an instance, indicia means 80 is not required.

INDUSTRIAL APPLICABILITY

Apparatus 10 is utilized primarily for drainage of fuel from wing tanks or aircraft. However, it also is suitable for drainage of any kind of liquid desired to be drained from a container or the like in any other industrial classification or utilization.

I claim:

1. A drainage apparatus comprising
   a stand mast,
   means for supporting said stand mast on a working surface,
   first-class lever means having a fulcrum and including a load arm and an effort arm fulcrumed on said stand mast,
   funneling means pivotally attached to said effort arm,
   means fulcrumed on said stand mast and pivotally attached to said funneling means for maintaining in drainage orientation said funneling means during operation of said lever means, and
   means for locking said funneling means in a fixed position after operation of said lever means,
   said maintaining means being fulcrumed on said stand mast below the fulcrum for said lever means.

2. The apparatus of claim 1 wherein said maintaining means comprises
   arm means having first and second ends, a first link means pivotally mounted on said load arm its one end pivotally attached to the first of said ends of said arm means, and a second link means pivotally connecting together said first link means and funneling means.

3. The apparatus of claim 1 or claim 2 including
means mounted in said funneling means for engaging a valve or the like.

4. The apparatus of claim 3 wherein said load arm is inclined downwardly relative to said effort arm.

5. The apparatus of claim 4 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

6. The apparatus of claim 5 including an adaptor mounted between said tube and sleeve.

7. The apparatus of claim 3 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

8. The apparatus of claim 7 including an adaptor mounted between said tube and sleeve.

9. The apparatus of claim 2 wherein said locking means comprises
adjustable clamping means mounted on said effort arm and
a rod pivotally connected at its one end to said clamping means and connected to the second end of said arm means.

10. The apparatus of claim 1 or claim 2 wherein said load arm is inclined downwardly relative to said effort arm.

11. The apparatus of claim 10 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

12. The apparatus of claim 11 including an adaptor mounted between said tube and sleeve.

13. A drainage apparatus comprising
a stand mast,
means for supporting said stand mast on a working surface,
first-class lever means having a fulcrum and including a load arm and an effort arm fulcrumed on said stand mast,
funneling means pivotally attached to said effort arm,
means pivotally attached to said funneling means and fulcrumed to said stand mast below the fulcrum for said first class lever means for maintaining in drainage orientation said funneling means during operation of said lever means,
means for locking said funneling means in a fixed position after operation of said lever means,
means mounted in said funneling means for engaging a valve or the like, and
means mounted to said supporting means for wheeling said apparatus on the working surface from one location to another, and
means mounted on said stand mast for adjusting the positions of the fulcrums for said first-class lever means.

14. The apparatus of claim 13 including
means for telescopically mounting said stand mast to said supporting means.

15. The apparatus of claim 14 wherein said adjusting means comprises pairs of diametrically opposed holes spaced along said stand mast and a pair of like holes mounted in said supporting means whereby a pin through aligned holes in stand mast and supporting means mounts said stand mast to said supporting means.

16. The apparatus of claim 15 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

17. The apparatus of claim 16 including an adaptor mounted between said tube and sleeve.

18. The apparatus of claim 14 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

19. The apparatus of claim 18 including an adaptor mounted between said tube and sleeve.

20. The apparatus of claim 13 wherein said funneling means comprises
a tube through which fluid drains,
a first indicia mounted on said tube,
a sleeve exteriorly mounted about said tube,
a second indicia correlated to said first indicia mounted about said sleeve,
said sleeve operatively connected to said first class lever means and maintaining means,
whereby degree of angular rotation of said tube relative to said sleeve is measured by correlation of said first and second indicia.

21. the apparatus of claim 20 including an adaptor mounted between said tube and sleeve.

* * * * *